(12) United States Patent
Lenti et al.

(10) Patent No.: US 6,500,894 B1
(45) Date of Patent: Dec. 31, 2002

(54) HYDRO- OIL-REPELLENT COMPOSITIONS

(75) Inventors: Daria Lenti, Alessandria (IT); Tania Trombetta, Milan (IT); Gabriella Carignano, Milan (IT)

(73) Assignee: Ausimont S.p.A., Milan (IT)

( * ) Notice: Subject to any disclaimer, the term of this patent is extended or adjusted under 35 U.S.C. 154(b) by 0 days.

(21) Appl. No.: 09/534,153

(22) Filed: Mar. 24, 2000

(30) Foreign Application Priority Data

Mar. 25, 1999 (IT) .......................... MI99A0608

(51) Int. Cl.⁷ .............................. C08L 75/00
(52) U.S. Cl. .................. 524/507; 524/805; 524/839; 524/840
(58) Field of Search ................ 524/507, 805, 524/839, 840

(56) References Cited

U.S. PATENT DOCUMENTS

| | | |
|---|---|---|
| 2,803,615 A | 8/1957 | Ahlbrecht et al. |
| 2,839,513 A | 6/1958 | Ahlbrecht et al. |
| 2,995,542 A | 8/1961 | Brown |
| 3,356,628 A | 12/1967 | Smith et al. |
| 3,536,749 A | 10/1970 | Groves |
| 3,814,741 A | 6/1974 | Caporiccio et al. |
| 4,373,043 A | * 2/1983 | Yagi .......................... 524/130 |
| 4,525,423 A | 6/1985 | Lynn et al. |
| 4,529,658 A | 7/1985 | Schwartz et al. |
| 5,650,159 A | * 7/1997 | Lion .......................... 424/401 |
| 5,714,082 A | 2/1998 | Boardman et al. ......... 252/8.62 |

FOREIGN PATENT DOCUMENTS

| | | |
|---|---|---|
| EP | 0 273 449 A1 | 7/1988 |
| EP | 0 273 449 B1 | 3/1992 |
| EP | 0 533 159 A1 | 3/1993 |
| EP | 0 337 312 B1 | 6/1993 |
| EP | 0 622 653 A1 | 11/1994 |
| EP | 0 689 908 A1 | 1/1996 |
| EP | 0 870 778 A1 | 10/1998 |
| WO | WO 93/01349 | 1/1993 |

* cited by examiner

Primary Examiner—Edward J. Cain
(74) Attorney, Agent, or Firm—Arent Fox Kintner Plotkin & Kahn

(57) ABSTRACT

Compositions formed of aqueous dispersions comprising a mixture of the following fluorinated polymers:

A) (meth)acrylic (co)polymers containing fluorine, and
B) cationic ionomers of fluorinated polyurethanes based on (per) fluoropolyethers, the weight ratio A):B), calculated on the dry product, being in the range 70:30 and 30:70.

20 Claims, No Drawings

HYDRO- OIL-REPELLENT COMPOSITIONS

The present invention relates to compositions to be applied on textiles to make them hydro- and oil-repellent in combination with a very good softness and with the maintenance of the textile appearance.

In order to make hydro- and oil-repellent the surfaces of various materials, the use of various types of polymers, also fluorinated, is known in the prior art. For example fluorinated polymers with various kinds of functionality can be mentioned. Specifically for textiles, fluorinated polymers having an acrylic base wherein the fluorinated part is formed of fluorocarbon chains, can be mentioned. Other fluorinated polymers used to give hydro- and oil-repellence are those having a (per)fluoropolyether structure, in particular polyurethanes. These polymers are used in the form of their aqueous dispersions -to treat textiles. Hydro- and oil-repellence depend on the kind of polymer and the functionality.

In all the patents of the prior art no reference is made to the softness of the treated textiles. This is an essential feature since the treated textiles in addition to very good hydro- and oil-repellence values must show a softness which is substantially similar to that of the untreated textiles. By textile appearance it is meant that the treatment does not substantially change the colour and the gloss with respect to the textiles as such.

U.S. Pat. No. 2,995,542, U.S. Pat. No. 3,356,628 and U.S. Pat. No. 4,529,658 relate to the synthesis of fluoroacrylic polymers and their use for the fiber and textile treatment. After treatment with these polymers, very good hydro- and oil-repellence values, higher than those obtainable with other fluorinated polymers which have other kinds of functionality and structure, are obtained. However, the fluoroacryl polymers show the following drawbacks: the fiber or textile surface appearance is modified, perspirability is reduced and textiles become stiffer. This last aspect of the treated textiles is determined by the softness examination, as called in the technical language. In case of the application of said films, the textile softness becomes worse.

The need was therefore felt to have available compositions for the surface textile treatment combining the very good hydro- and oil-repellence characteristics with the appearance and softness of the untreated textiles. In other words there was the need to find compositions which, besides conferring very good hydro- oil-repellence, did not worsen the textile softness and appearance.

It has now been surprisingly and unexpectedly found that it is possible to solve said technical problem by treating textiles with compositions in the form of aqueous dispersions as hereinunder defined.

It is an object of the present invention compositions formed of aqueous dispersions comprising a mixture of the following fluorinated polymers:

A) (meth)acrylic (co)polymers containing fluorine, and
B) cationic ionomers of fluorinated polyurethanes based on (per)fluoropolyethers, the weight ratio A):B), on the dry product, being in the range 70:30 and 30:70, preferably 60:40 and 40:60, with the proviso that component A) must not be lower than about 0.5% by weight as dry product in the dispersion.

Preferably component B) is present in the dispersion at a concentration of about 0.4% by weight, more preferably 0.5%.

The invention compositions are used in aqueous dispersions at a concentration in the range 0.7–3% w/w, preferably 0.8–1.5% w/w, still more preferably 0.9–1.3% w/w, determined as dry residue.

Component B), cationic ionomer fluorinated polyurethanes, usable in the present invention, are based on (per)-fluoropolyethers and are obtainable with known methods of the prior art. See for example EP 273,449, EP 337,312, EP 533,159, EP 689,908.

The (per) fluoropolyether-based ionomer polyurethanes have a fluorine content preferably higher than 15% by weight, more preferably higher than 25% by weight, still more preferably higher than 35% by weight, and contain in their structure hydrophilic ionic groups of cationic nature, wherein the cationic groups can be present as side groups and/or in the chain, the side groups being separated from the polymer chain by a bivalent alkylen radical $((R)_a)_{zI}$, wherein zI is an integer equal to one or zero, a is an intger from 1 to 20, preferably from 3 to 10, R being of the $CR_1R_2$, $Y(CR_1R_2)_b$ type wherein:

Y is a linking bivalent radical, different from $CR_1R_2$, preferably —COO—, —CONH—, —OCONH—, —O—; b is an integer from 0 to 20; $R_1$ and $R_2$, equal to or different from each other, are: H, aliphatic radicals having from 1 to 10 carbon atoms, cycloaliphatic radicals having from 5 to 20 carbon atoms, aromatic having from 6 to 20 carbon atoms, the cyclic radicals can optionally contain heteroatoms.

The ionomer polyurethanes are obtained by polymerization in two steps according to known various processes which have in common the following steps:

a first step, wherein a fluorinated diisocyanate prepolymer is prepared by reacting with hydrogenated diisocyanates in organic solvents of polar type, for example ketones and acetates, bifunctional (per) fluoropolyethers having alcoholic or acid functionality, optionally mixed with hydrogenated macrodiols. a second step, which depending on the processes consists of:

I) partial chain extension by chain extenders such as dials or diamines ($C_2$–$C_{12}$) and ionomers, described in the above mentioned prior art which is herein incorporated by reference, then subsequent dispersion in water and salification with polymerization completion by formation of ureic bonds; or II) insertion of ionomers and then salification, dispersion and polymerization by chain extension in water in the presence of diamines; or III) insertion of ionomers and completion of the chain extension in solvent to obtain the polymer having the desired molecular weight, and contemporaneous dispersion and salification in water of the so obtained polymer; alternatively the polymer can be first salified and then dispersed in water.

The hydrogenated macrodiols are for example saturated or unsaturated $C_2$–$C_4$ polyoxyalkylenes, for example PTMEG (polytetramethylenglycol), PEG (polyethylenglycol), PPG (polypropylenglycol), PBDH (polybutadienglycol), polyesters obtained by polycondensation of aliphatic anhydrides of dicarboxylic acids having from 4 to 9 carbon atoms with aliphatic $C_2$–$C_8$ diols, alone or in admixture, ex. PCL (polycaprolactonediol).

The fluorinated polyurethanes according to the present invention contain in the chain units derived from ionomers such as for example the following:

a. diols containing a substituted aminic group, having formula:

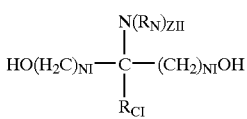

(I.a)

wherein $R_N$ is a linear or branched $C_1$–$C_6$ alkyl, zII is 1 or 2, when zII=1 the nitrogen free valence is saturated with one H atom, $R_{CI}$ is H or $C_1$–$C_4$ alkyl, NI ranges from 1 to 4;

b. tertiary alkyldialkanolamines of formula

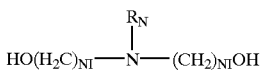

(I.b)

wherein $R_N$ and NI have the above mentiond meanings; examples of said amines are methyldiethanolamine, butyldiethanolamine, methyldiisopropanolamine, or c. the ionomers corresponding for example to the formula:

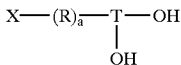

(I.c)

wherein T is an alkylene radical with a number of carbon atoms from 1 to 20 and has the meaning of $R_1$, $X=N(R_1)_2$, R has the above mentioned meaning of $R_1$; or d. diol compounds containing substituted aminic groups corresponding to the following formulae:

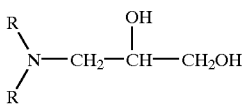

(I.d.1)

wherein R has the above mentioned meaning of $R_1$

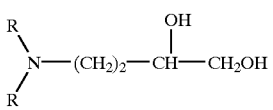

(I.d.2)

wherein R has the above mentioned meaning of $R_1$

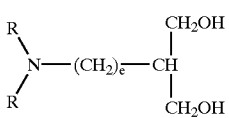

(I.d.3)

e is aninteger from 1 to 10.

The PFPEs contained in ionomer fluorinated polyurethanes are used in the synthesis of these polymers in the first step of the above described synthesis method; said PFPEs have average number molecular weight in the range 500–4.000, preferably 1.000–2.000, and contain repeating units selected from the following:

$(CF(CF_3)—CF_2O)$, $(CF_2CF_2O)$, $(CF_2(CF_3)O)$, $(CF_2—CF(CF_3)O)$ $(CF_2CF_2CF_2O)$, $(CF_2CF_2CH_2O)$, said units being statistically distributed in the polymer chain.

In particular they belong to one or more of the following classes:

1) $—O(CF(CF_3)—CF_2O)_n(CF(CF3)O)_m(CF_2O)_p—$
   having a random distribution of the perf luorooxyalkylene units and n, m, p are integers and have average values such as to meet the above previously mentioned requirements of average molecular weight;

2) $—O(CF_2CF_2O)_{n'}(CF_2O)_{m'}—$
   with random distribution of the perfluorooxyalkylene units, m' and n' are integers such as to meet the above mentioned requirements of molecular weight;

3) $—O(CF_2CF_2O)_{n''}(CF_2O)_{m''}(CF(CF_3)O)_{p''}(CF(CF_3)—CF_2O)_{o''}—$
   wherein m", n", p", o" are integers such as to meet the above mentioned requirements of molecular weight;

4) $—O(CF_2—CF(CF_3)O)_t—$
   wherein t is an integer such as to meet the mentioned requirements of molecular weight;

$—O(CF_2CF_2CF_2O)_s—$ or $—O(CF_2CF_2CH_2O)_s—$
   wherein s is an integer such as to meet the above mentioned requirements of molecular weight.

Preferably the repeating units in the PFPES of the ionomer polyurethanes have the structure 1).

The ionomer fluorinated polyurethanes have a fluorine content preferably in the range 30–40% by weight.

The polymer salification is carried out with organic or inorganic acids such as hydrochloric, phosphoric, formic, acetic, lactic acid, etc. or by carrying out the nitrogen quaternization with alkylating agents known in the art, for example methyl iodide, dimethylsulphate, benzyl bromide, etc.

Said salts are prepared by adding the acid to the reaction solution containing the polyurethane in a mixed aqueous/organic solvent, wherein the organic solvent is partially or totally soluble with water, for example ethyl acetate.

The so prepared aqueous dispersions of the polyurethanes are generally stable to sedimentation during the time, also in the absence of surfactants and/or protective colloids. Optionally, if necessary, non ionic surfactants, such as ethoxylated derivatives of alcohols having a linear $C_{12}$–$C_{20}$ chain or alkylphenols, in amounts in the range 0.01–1.5% by weight with respect to the polymer, can be added to the dispersion; also cosolvents, more specifically polar solvents such as propylene glycol, N-methylpyrrolidone in amounts not higher than 10% by weight with respect to the polymer, can be added.

The preferred component A) fluorinated (meth)acrylic (co)polymers are formed of monomers comprising perfluoroalkyl groups preferably with $C_3$–$C_{30}$ chain, or (per)fluoropolyether groups preferably having a chain from 4 to 30 carbon atoms; optionally one or more sulphonamide groups; hydrogenated (meth)acrylic monomers known in the art, and cationic (meth)acrylic ionomer monomers.

As examples of these monomers reference is preferably made to the formulae (I), (II), (III) and (IV) reported below, wherein the substituents have the mentioned meanings.

These fluoro(meth)acrylate copolymers are for example described in the U.S. Pat. Nos. 2,803,615, 2,839,513, 2,995,542, 3,814,741, 3,356,628, 3,536,749, 4,525,423, 4,529,658, EP 622,653 and EP 870,778 as precursor acrylic monomers.

Said copolymers can be prepared for example by emulsion polymerization, in the presence of an emulsifier, catalyst and chain transfer agent as described for example in U.S. Pat. No. 4,525,423, herein incorporated by reference. For example the fluoroacrylated copolymers can be obtained by using the following monomers:

a) from 1 to 30% by weight of monomers or mixtures thereof having formula $$R^1O(R^2O)_{nII}[C(O)CH_2O]_{mII}COCH=CH_2 \quad (II)$$

wherein
$R^1$ is a $C_1$–$C_{20}$ alkyl, cycloalkyl, haloalkyl, halocycloalkyl group (halo=Cl, Br);
$R^2$ is a $C_1$–$C_6$ alkylene or haloalkylene group, each $R^2$ group can be equal to or different from the other $R^2$ groups, at least one $R^1$ or $R^2$ group contains an halogen atom,
nII is an integer from zero to 10, with the proviso that when n is zero $R^1$ is a $C_1$–$C_{16}$ haloalkyl or halocycloalkyl group;
mII is zero or 1;
b) from 60 to 80% of monomers or mixtures thereof having formula $$(R_{f})_{pI}QOCOCH=CH_2 \quad (I)$$

wherein
$R_f$ is a fluoroalkyl radical with $C_3$–$C_{30}$, preferably $C_3$–$C_{20}$, carbon atoms or it is a PFPE (per) fluoropolyether radical containing the above mentioned units and having a number of carbon atoms from $C_5$ to $C_{30}$;
pI is 1 or 2;
Q is a linking bridge, divalent or trivalent, e.g., aliphatic from 1 to 12 carbon atoms, or a $C_6$–$C_{12}$ aromatic group; Q can optionally contain heteroatoms such as N, O, S or carbonylimino, sulphonylimino or carbonyl groups; Q can be unsubstituted or is linked to substituents selected from the following: halogen atoms, hydroxyl groups, $C_1$–$C_6$ alkyl radicals; Q preferably does not contain double or triple bonds; preferably Q is selected from the following radicals: —$CH_2$—, —$C_2H_4$—, —$SO_2N(R_5)$ $C_2H_4$—, —$SO_2N(R^5)CH_2CH(CH_3)$—, $C_2H_4SO_2N$ $(R^5)C_4H_8$—, $R^5$ is H or a $C_1$–$C_4$ alkyl;
c) from 0 to 15%, preferably from 1 to 15% of monomers or mixtures thereof having formula

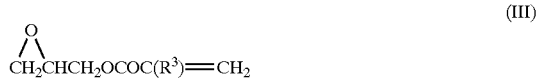

wherein $R^3$ is H or methyl;
d) from 1 to 6% of cationic monomers, or mixtures thereof, of formula $$CH_2=C(R^4)Z_{IV}Y_{IV}^+X^- \quad (IV)$$

wherein $R^4$ is H or methyl,
the $Z_{IV}$ group is a divalent electron attracting group and has a carbonyl or aromatic group or an oxygen or sulphur atom directly linked to the monomer vinylidene radical; the $Z_{IV}$ group can be preferably selected from the following:
—$COOCH_2CH(OH)CH_2$—, —$COO(CH_2)_{kIV}$—, —$CONH(CH_2)_{kIV}$, wherein kIV is an integer from 2 to 6;
$Y_{IV}^+$ is a monovalent organic cation and comprises (a) the pyridinium ion, (b) the $N^+(R^6)_3$ ion wherein each $R^6$ is independently H or a $C_1$–$C_4$ alkyl group, or two of any $R^6$ combine to form a $C_4$–$C_5$ alkylene group, or two of any $R^6$ are —$(CH_2)_2$— and combine with an oxygen atom to give the structure —$(CH_2)_2$—O—$(CH_2)_2$—, (c) phosphonium ions and (d) sulphonium ions; preferably $Y_{IV}^+$ is $N^+(R^6)_3$ wherein $R^6$ is as above defined;
$X^-$ is an anion, preferably an halide (Cl, Br, I) or an alkyl sulphate;
e) from 0 to 20% of monomers containing at least a double bond, such as for example maleic anhydride, acrylonitrile, vinyl acetate, vinylchloride, vinyl fluoride, vinylidene fluoride, vinylidene cyanide, vinyl chloroacetate, vinyl silicon, ethylene, styrene, alkyl styrenes, halogenated styrenes, methacrylonitrile, N-vinyl carbazole, vinyl pyridine, vinyl alkyl ethers, vinyl alkyl ketones isoprene, butadiene, chloroprene, fluoroprene, and mixtures thereof. The preferred monomers of group a) are the esters (halo)alkyl and (halo) cycloalkyl of the (meth)acrylic acid, halo=Cl, Br, from 1 to 20 carbon atoms.

The preferred monomers of group b) are those containing $C_4$–$C_{12}$ perfluoroalkyl chains, still more preferably containing the sulphonamide group, such as for example $C_8F_{17}SO_2N(CH_3)CH_2CH_2OCOCH=CH_2$; when $R_f$ is based on PFPE, T'O$(C_3F_6O)_m(CF_2O)_nCF_2CH_2OCH_2CH_2OCOC$ $(CH_3)=CH_2$, wherein T'=perfluoroalkyl $C_1$–$C_3$, can be mentioned, optionally one or more atoms of F of T', generally one F atom, are substituted by H and/or Cl; m and n are as above defined.

The monomers usable in the group b) can also have the structures corresponding to the general formula:

wherein T', n' and m' have the above mentioned meanings, q is an integer from 0 to 1, A is a bivalent radical, preferably of linear aliphatic type $(CH_2)_{m'o}$ wherein m'0 is an integer from 1 to 20, or (alkylen)cycloaliphatic, (alkylen)aromatic type. A optionally can contain heteroatoms in the ring or in the alkylene chain, or it can be both a linear and branched polyalkylenoxy chain, in particular containing repeating units of the $CH_2CH_2O$, $CH_2CH(CH_3)O$, $(CH_2)_3O$, $(CH_2)_4O$ type. A can also contain groups of amidic, ester, ether, COO type, of sulphide, iminic type; the carbon atom number of the cycloaliphatic compounds being from 3 to 20, for the aromatic ones from 6 to 20; the group, A can also be a combination of the mentioned types; the bond group of A with the perfluoromethylene group of the fluorinated chain can be for example: —C—, —O—, —CONR—(R is H, alkyl, cycloaliphatic or aromatic groups having less than 15 carbon atoms), —$CO_2$—, —COS—, —CO—, one heteroatom, or the triazinic or heterocyclic aromatic groups having 5 or 6 atoms containing 2 or more heteroatoms equal to or different from each other; $T_0$ is —COOCH=$CH_2$, —COOCH$_2$CH=$CH_2$.

The aqueous dispersions according to the present invention are prepared by adding to the aqueous dispersions of the fluorinated polyurethanes, optionally containing the indicated additives, the aqueous dispersions of the fluoroacrylates, in the required weight ratios.

The fluoroacrylate aqueous dispersions, for example Scotchgard® by 3M®, are available on the market.

As said, the aqueous dispersions of the present invention are used for the treatment of textiles, specifically natural fiber textiles, for example cotton, silk, wool; synthetic fibers, e.g., acrylic, polyamide, polyester fibers, etc.

The aqueous dispersions of the present invention are used as such or diluted, depending on the type of application technique on textiles. The application technique are the known ones, for example by spreading, by immersion and subsequent mechanical removal of the polymer excess deposited on the textiles, by spray or roll application.

For example when the application is made by spreading, the dispersion can be formulated by adding additives such as thickening agents, optionally together with the other conventional excipients of these formulations. In the immersion or spray application the dispersion is diluted with deionized water depending on the desired use. Tests carried out by the Applicant (see the Examples) have shown that the aqueous dispersions containing the sole component A) fluoroacrylic copolymers confer to textiles good hydro- and oil-repellent properties when said dispersions have concentrations equal to or higher than a specific value, which depends on the treated substratum. With these dispersions however it is not possible to obtain a textile satisfactory softness.

On the contrary by using an aqueous dispersion according to the present invention, containing a mixture of fluoroacrylates and polyurethanes in the ratios according to the present invention, the textile softness remains unchanged in comparison with the untreated sample and the hydro- and oil-repellent properties are maintained or improved.

It has been found that the dispersions of the invention always show high hydro- oil-repellence values also when the amount of the fluoroacrylic component A) is such that if it was used alone, in the absence of the component B), would give very low hydro- oil-repellence values. This is surprising since the fluoroacrylic polymer concentration in the mixture is lower than that which allows to obtain the same hydro-oil-repellence degree.

It is still more surprising that the hydra-oil-repellence values of the compositions of the invention remain at high values even using the component B) poyurethane which as such has lower hydro- oil-repellence values than the component A).

Therefore the mixture of the two polymers has a synergic effect both as regards the textile hydro- oil-repellence treatment and the softness.

Furthermore it has been unexpectedly found that the hydro- and oil-repellence and softness properties using the dispersion of the invention are maintained even after various textile washings. Tests carried out by the Applicant have shown that after 4 washings in water the treated textiles show substantially unchanged properties. Also washings of textiles treated with detergents do not show meaningful changes with the number of washings.

The following examples are to be considered for illustrative purposes and they cannot be deemed as limitative of the scope of the present invention.

EXAMPLE 1a

Hydro-repellence Test

The test is carried out by contacting the textiles for 10 seconds with a drop of hydroalcoholic water/isopropanol (IPA) mixture having a rising concentration in alcohol, using at the end a drop of pure alcohol. After drop removal, it is noticed if the liquid leaves a surface halo or if it penetrates the weft. The assigned hydro-repellence value is the number which corresponds to the liquid which is neither penetrated nor has left halo on the textiles.

| rating | Water/IPA % by weight mixture |
| --- | --- |
| W | 100/0 |
| 1 | 90/10 |

-continued

| rating | Water/IPA % by weight mixture |
| --- | --- |
| 2 | 80/20 |
| 3 | 70/30 |
| 4 | 60/40 |
| 5 | 50/50 |
| 6 | 40/60 |
| 7 | 30/70 |
| 8 | 20/80 |
| 9 | 10/90 |
| 10 | 0/100 |

The sample to be tested passes the test if the hydrorepellence value is at least 4. W means that the sample resists only water. 0 means that the water drop is immediately absorbed.

EXAMPLE 1b

Oil-repellence Test

The test is carried out according to the method AATCC Standard test 118-1978, wherein the resistance opposed by the textiles to the penetration of a drop of oils having different surface tension is evaluated. The drop is contacted with the textiles for 30 seconds and then removed. One ascertains if the oil leaves a surface halo or if it penentartes the weft. The assigned oil-repellence value is the numder which corresponds to the oil which is neither penatrated nor has left halo on the textiles.

| rating | oil |
| --- | --- |
| 1 | vaseline oil |
| 2 | vaseline oil/hexadecane 65/35 |
| 3 | n-hexadecane |
| 4 | n-tetradecane |
| 5 | n-dodecane |
| 6 | n-decane |
| 7 | n-octane |
| 8 | n-heptane |

The sample to be tested passes the test if the oil-repellence value is at least 4.0 means that the vaseline oil is immediately absorbed.

EXAMPLE 1c

Evaluation of the Softness Degree of the Treated Textiles by Comparison with the Sample not Treated with the Invention Aqueous Dispersion.

The sample softness to the touch before and after the treatment is evaluated. The evaluation is carried out on 10 samples according to the following scale:

3: the sample after treatment remains unchanged to the touch.

2: the sample after treatment is less soft, slightly stiff.

1: the sample after treatment appears changed to the touch and is evidently stiffer than the initial textiles. The results represent the average value of the marks assigned to each of the 10 samples.

The sample passes the test if the assigned mark is at least 2, preferably higher.

On some samples the above described tests are repeated after washing by immersion for a time of about 30 minutes in 150 ml of deionized water under stirring.

EXAMPLE 2

Synthesis of a Cationic Polyurethane 250 g of a (per)fluoropolyether diol having hydroxyl equivalent weight 990 are dropped, in 1 hour, in a 1 liter flask equipped with reflux and dropping funnel, heated by an oil bath, containing a mixture thermostated at 80° C. formed of 56.14 g of isophorone diisocyanate, 137 g of ethyl acetate and 0.9 ml of a 20% solution by weight of dibutyl tin dilaurate in ethyl acetate. When the addition of (per)fluoropolyether diol is over, the mixture is let react for two hours at 80° C. At the end it is cooled to 60° C. and a solution in 183 g of ethyl acetate of the following reactants is added by means of a dropping funnel:

- 7.5 g of N-methyldiethanolamine (N-MDEA) (hydroxyl equivalent weight 59.58, 0.128 eq.).
- 5.67 g of butandiol (hydroxyl equivalent weight 45, 0.128 eq.). (ratio by moles N-MDEA:butandiol 1:1).

The final solution has a dry product content of 50% by weight. It is heated to 80° C., maintaining this temperature until the reaction is over, which is determined by IR analysis from the disappearance of the signal connected to the NCO group. It is cooled to room temperature and a solution formed of 4.15 g of glacial acetic acid and 80 g of isopropylic alcohol is added. It is left under stirring for one hour at room temperature by adding at the end deionized water in such amount as to obtain a dry product content within the desired limits. The solvents (ethyl acetate and isopropanol) are distilled until a residual amount of organic solvent in the aqueous dispersion lower than 1% is obtained. The final aqueous dispersion has a content, determined as dry residue, of 30% by weight.

EXAMPLE 3

Synthesis of a Cationic Polyurethane 250 g of a (per)fluoropolyether dial having hydroxyl equivalent weight 990 are dropped, in 1 hour, in a 1 liter flask equipped with reflux and dropping funnel, heated by an oil bath, containing a mixture thermostated at 80° C. formed of 56.14 g of isophorone diisocyanate, 137 g of ethyl acetate and 0.9 ml of a 20% solution by weight of dibutyl tin dilaurate in ethyl acetate. When the addition of (per)fluoropolyether diol is over, the mixture is let react for two hours at 80° C. At the end it is cooled to 60° C. and a solution in 183 g of ethyl acetate of the following reactants is added by means of a dropping funnel in the global time of one hour:

- 7.5 g of N-methyldiethanolamine (N-MDEA) (hydroxyl equivalent weight 59.58, 0.128 eq.).
- 9.09 g of 1,4-cyclohexyldimethanol (CHDM) (hydroxyl equivalent weight 72.11, 0.128 eq.). (ratio by moles N-MDEA:CHDM 1:1).

The final solution has a dry product content of 50% by weight. It is heated to 80° C., maintaining this temperature until the reaction is over, which is determined by IR analysis by the disappearance of the signal connected to the NCO group. It is cooled to room temperature and a solution formed of 4.15 g of glacial acetic acid and 80 g of isopropylic alcohol is added. It is left under stirring for one hour at room temperature by adding at the end deionized water in such amount as to obtain a dry product content within the desired limits. The solvents (ethyl acetate and isopropanol) are distilled until a residual amount of organic solvent in the aqueous dispersion lower than 1% is obtained. The final aqueous dispersion has a dry product content of 30% by weight.

EXAMPLE 4

Synthesis of a Cationic Polyurethane 250 g of a (per)fluoropolyether diol having hydroxyl equivalent weight 990 are dropped, in 1 hour, in a 1 liter flask equipped with reflux and dropping funnel, heated by an oil bath, containing a mixture thermostated at 80° C. formed of 56.14 g of isophorone diisocyanate, 137 g of ethyl acetate and 0.9 ml of a 20% solution by weight of dibutyl tin dilaurate in ethyl acetate. When the addition of (per) fluoropolyether diol is over, the mixture is let react for two hours at 80° C. At the end it is cooled to 60° C. and a solution in 183 g of ethyl acetate of the following reactants is added by means of a dropping funnel, in the global time of one hour:

- 7.5 g of 3-dimethylamino-1,2-propandiol (hydroxyl equivalent weight 59.58, 0.128 eq.).
- 9.09 g of 1,4-cyclohexyldimethanol (CHDM) (hydroxyl equivalent weight 72.11, 0.128 eq.).

A final solution having a dry product content of 50% by weight is obtained. It is heated to 80° C., maintaining this temperature until the reaction is over, which is determined by IR analysis from the disappearance of the signal connected to the NCO group. It is cooled to room temperature and a solution formed of 4.15 g of glacial acetic acid and 80 g of isopropylic alcohol is added. It is left under stirring for one hour at room temperature by adding at the end deionized water in such amount as to obtain a dry product content within the desired limits. The solvents (ethyl acetate and isopropanol) are distilled until a residual amount of organic solvent in the aqueous dispersion lower than 1% is obtained. The final aqueous dispersion has a dry product content of 30% by weight.

APPLICATION EXAMPLES

EXAMPLE 5 (Comparative)

Portions of the aqueous dispersion of the cationic polyurethane of Example 2 are diluted with deionized water inorder to obtain two dispersions, having a final concentration of 0.8 and 1.2% by weight respectively, said final concentrations regulated determining the dispersion dry residue.

The used textiles are polyester/cotton 65/35 and the specimen has 5×5 cm sizes. The treatment is carried out by dipping the samples in 10 ml of each dispersion for 1 minute. The treated specimen is taken away from the bath and mechanically trated to remove the dispersion excess. It is dried in a stove at 150° C. for 2 minutes and then the tests described in Examples 1a, 1b and 1c are carried out.

Each specimen is subsequently washed by dipping for a time of about 30 minutes in 150 ml of deionized water, under stirring. At the end the specimen are recovered and treated as above described, and subjected again to tests 1a and 1b.

The test reults are reported in Table 1 and show that the textiles treated with the cationic polyurethane of Example 2 have unsatisfactory hydro- and oil-repellence values.

EXAMPLE 6 (Comparative)

Portions of the aqueous dispersion of fluoroacrylate polymers Scotchgard° FX 3569 (3M®), are diluted with deionized water so as to obtain dispersions having final concentrations 0.2, 0.4, 0.6, 0.8 and 1.2% by weight respectively.

The used textiles, the number of the used specimen for each tested dispersion and the effected treatments are the same as described in Example 2.

The test results are reported in Table 1 and show that the specimen treated with the diluted aqueous dispersions obtained from the one to be tested, have satisfactory hydro- and oil-repellence values with dispersion concentrations equal to or higher than 0.8% by weight. It is noticed that the specimen softness in comparison with the untreated textiles becomes worse at all the tested concentrations.

EXAMPLE 7

Three mixtures are prepared, formed of the aqueous dispersion of cationic polyurethane of Example 2 and of the aqueous dispersion Scotchgard® FX 3569 (3M®) in ratios by weight calculated on the dry part of each dispersion, of 60/40, 50/50 and 40/60 respectively. Dilutions with deionized water are then effected so as to obtain dispersions having a final concentration 0.2, 0.4, 0.6 and 1.2% by weight for each of the three mixtures.

The used textiles, the number of the used specimen for each tested dispersion and the treatments carried out are the same as described in Example 2. The test results are reported in Table 1 and show that the specimen treated with the three mixtures to be tested pass the hydro- and oil-repellence test at the global concentration of dry product of 1.2% by weight and that at the same concentration the textile specimen softness remains substantially unchanged with respect to the starting textiles. Furthermore the textile appearance, in terms of colour and gloss, is not substantially changed with respect to the textiles as such.

EXAMPLE 8

Three mixtures are prepared, formed of the aqueous dispersion of cationic polyurethane of Example 3 and of the aqueous dispersion Scotchgard® FX 3569 (3M®) in ratios by weight calculated on the dry part of each dispersion, of 60/40, 50/50 and 40/60 respectively. Dilutions with deionized water are then effected so as to obtain dispersions having a final concentration of 1.2% by weight of dry product for each of the three mixtures.

The used textiles, the number of the used specimen for each tested dispersion and the treatments carried out are the same as described in Example 2. The test results are reported in Table 1 and show that the specimen treated with the three mixtures to be tested at the indicated dry concentration pass the tests. Furthermore the textile appearance, in terms of colour and gloss, is not substnatially changed with respect to the textiles as such.

EXAMPLE 9

A portion of the aqueous dispersion of the polyurethane obtained in Example 4 is diluted, by adding deionized water, until an aqueous dispersion having a final dry concentration of 1.2% w/w, is obtained. A portion of the diluted dispersion is mixed with an equal weight of the dispersion having 12% of dry product Scotchgard® FX 3569 (3M®) prepared in Example 6, obtaining an aqueous dispersion of the two polymers 50/50 by weight of each polymer on the total dry product, with global concentration of dry product of 1.2W.

The used textiles and the effected treatments are the same as described in Example 2.

The test results are reported in Table 1 and show that the specimen treated with the dispersion formed of the 50/50 mixture prepared as above described, at the above mentioned dry product concentration, pass all the three tests. Besides the textile appearance, in terms of colour and gloss, is not substnatially changed with respect to the textile as such.

EXAMPLE 9a (Comparative)

A portion of the aqueous dispersion of the polyurethane obtained in Example 3 is diluted, by adding deionized water, until an aqueous dispersion having a final concentration of dry product of 1.2% w/w, is obtained.

The test results are reported in Table 1 and show that the specimen treated with the polyurethane dispersion give the same results as in the previous Example 5, passing only the softness test.

TABLE 1

Results of the hydro-repellence tests (Ex. 1a), oil-repellence (Ex. 1b) and softness (Ex. 1c) of textile samples treated with the invention dispersions diluted at the dry concentrations reported in the Table. In the first column: B) indicates the polyurethane fluorinated component and -A) the fluoroacrylate; the number fractions are ratios by weight B)/A)

| Ex. | disp. conc. % | Test Ex. 1a | Test Ex. 1b | After washing Test Ex. 1a | Test Ex. 1b | Test Ex. 1c |
|---|---|---|---|---|---|---|
| Ex. 5 B) | 0.8 | 2 | 2 | 2 | 2 | — |
|  | 1.2 | 2 | 2 | 2 | 2 | — |
| Ex. 6 A) | 0.2 | 0 | 0 | W | 0 | 1 |
|  | 0.4 | 0 | 1 | 2 | 2 | 1 |
|  | 0.6 | 2 | 3 | 3 | 3 | 1 |
|  | 0.8 | 4 | 4 | 5 | 5 | 1 |
|  | 1.2 | 5 | 5 | 5 | 5 | 1 |
| Ex. 7 60/40 B)/A) | 0.2 | 0 | 0 | 1 | 1 | — |
|  | 0.4 | W | 1 | 2 | 3 | — |
|  | 0.6 | 2 | 3 | 2 | 4 | — |
|  | 1.2 | 4 | 5 | 4 | 5 | 3 |
| 50/50 | 0.2 | 0 | 0 | W | 1 | — |
|  | 0.4 | 0 | 1 | 2 | 3 | — |
|  | 0.6 | 2 | 3 | 2 | 4 | — |
|  | 1.2 | 4 | 5 | 4 | 5 | 3 |
| 40/60 | 0.2 | 0 | 0 | W | 1 | — |
|  | 0.4 | 0 | 1 | 2 | 3 | — |
|  | 0.6 | 2 | 2 | 2 | 3 | — |
|  | 1.2 | 6 | 5 | 6 | 5 | 3 |
| Ex. 8 |  |  |  |  |  |  |
| 60/40 | 1.2 | 4 | 5 | 4 | 5 | 3 |
| 50/50 | 1.2 | 4 | 5 | 4 | 5 | 3 |
| 40/60 | 1.2 | 5 | 5 | 5 | 5 | 3 |
| Ex. 9 50/50 | 1.2 | 5 | 5 | 5 | 4 | 3 |
| Ex. 9a B) | 1.2 | 2 | 2 | n.d. | n.d. | — |

What is claimed is:

1. Compositions formed of aqueous dispersions comprising a mixture of the following fluorinated polymers:
   A) (meth)acrylic (co)polymers containing fluorine, and
   B) cationic ionomers of fluorinated polyurethanes based on (per)fluoropolyethers, obtained by the following steps:
      a first step, wherein a fluorinated diisocyanate prepolymer is prepared by reacting with hydrogenated diisocyanates in organic solvents of polar type, bifunctional (per)fluoropolyethers having alcoholic or acid functionality, optionally mixed with hydrogenated macrodiols;
      a second step, consisting of:
      I) partial chain extension by chain extenders, then subsequent dispersion in water and salification with polymerization completion by formation of ureic bonds; or
      II) insertion of ionomers and then salification, dispersion and polymerization by chain extension in water in the presence of daimines; or III) insertion of ionomers and completion of the chain extension insolvent to obtain the polymer having the desired molecular weight, and contemporaneous dispersion and salification in water of the so obtained polymer, alternatively the polymer first salified and then dispersed in water;

wherein the weight ratio A):B), calculated on the dry product, being in the range 70:30 and 30:70, with the proviso that component A) must not be lower than about 0.5% by weight as dry products in the dispersion.

2. Compositions according to claim 1, wherein component B) is present in the dispersion at a concentration of about 0.4% by weight, more preferably 0.5%.

3. Compositions according to claim 1, wherein the aqueous dispersions have a concentration in the range 0.7–3% w/w, preferably 0.8–1.5% w/w, still more preferably 0.9–1.3% w/w, as dry residue.

4. Compositions according to claim 1, wherein the polyurethanes have a fluorine content higher than 15% by weight, more preferably higher than 25% by weight, still more preferably higher than 35% by weight, and contain in their structure hydrophilic ionic groups of cationic nature, wherein the cationic groups can be present as side groups and/or in chain, the side groups being separated from the polymer chain by a bivalent alkylene radical $((R)_a)_{zI}$, wherein zI is an integer and is one or zero, a is an intger from 1 to 20, preferably from 3 to 10, R being of the $CR_1R_2$, $Y(CR_1R_2)_b$ type wherein: Y is a linking bivalent radical, different from $CR_1R_2$, preferably —COO—, —CONH—, —OCONH—, —O—; b is an integer from 0 to 20; $R_1$ and $R_2$, equal to or different from each other, are: H, aliphatic radicals having from 1 to 10 carbon atoms, cycloaliphatic radicals having from 5 to 20 carbon atoms, aromatic having from 6 to 20 carbon atoms, the cyclic radicals can optionally contain heteroatoms.

5. Compositions according to claim 4, wherein the fluorinated polyurethanes contain in the chain the following units derived from ionomers:

a. diols containing a substituted aminic group, having formula:

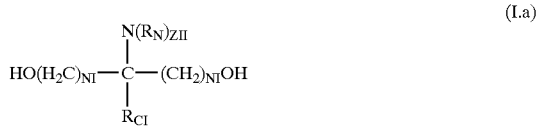

(I.a)

wherein $R_n$ is a linear or branched $C_1$–$C_6$ alkyl, zII is 1 or 2, when zII=1 the nitrogen free valence is saturated with one H atom, $R_{CI}$ is H or $C_1$–$C_4$ alkyl, NI ranges from 1 to 4;

b. tertiary alkyldialkanolamines of formula

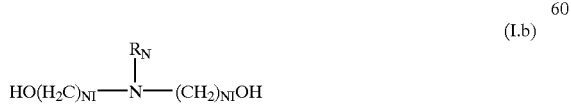

(I.b)

wherein $R_N$ and NI have the above mentiond meanings; or c. ionomers of formula:

(I.c)

wherein T is an alkylene radical with a number of carbon atoms from 1 to 20 and has the meaning of $R_1$, $X=N(R_1)_2$, R has the above mentioned meaning of $R_1$; or d. diolic compounds containing substituted aminic groups:

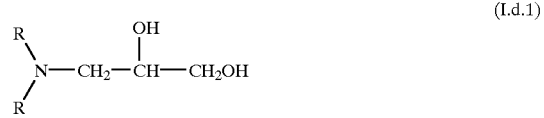

(I.d.1)

wherein R has the above mentioned meaning of $R_1$

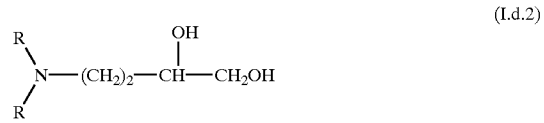

(I.d.2)

wherein R has the above mentioned meaning of $R_1$,

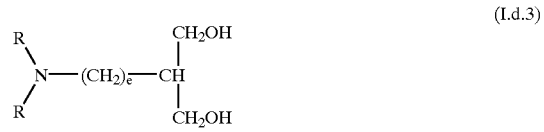

(I.d.3)

e is an integer from 1 to 10.

6. Compounds according to claim 4, wherein the PFPEs contained in the ionomer fluorinated polyurethanes have average number molecular weight in the range 500–4.000, preferably 1.000–2.000, and contain repeating units selected from the following:

$(CF(CF_3)$—$CF_2O)$, $(CF_2CF_2O)$, $(CF_2(CF_3)O)$, $(CF_2$—$CF(CF_3)O)$, $(CF_2CF_2CF_2O)$, $(CF_2CF_2CH_2O)$, said units being statistically distributed in the PFPE polymer chain.

7. Compositions according to claim 6, wherein the PFPE repeating units belong to one or more of the following classes:

1) —$O(CF(CF_3)$—$CF_2O)_n$ $(CF(CF_3)O)_m$ $(CF_2O)_p$—
having a random distribution of the perfluorooxyalkylene units and n, m, p are integers and have average values such as to meet the above previously mentioned requirements of average molecular weight;

2) —$O(CF_2CF_2O)_{n'}$ $(CF_2O)_{m'}$—
with random distribution of the perf luorooxyalkylene units, m' and n' are integers such as to meet the above mentioned requirements of molecular weight;

3) —$O(CF_2CF_2O)_{n''}$ $(CF_2O)_{m''}$ $(CF(CF_3)O)_{p''}$ $(CF(CF_3)$—$CF_2O)_{o''}$—
wherein m'', n'', p'', o'' are integers such as to meet the above mentioned requirements of molecular weight;

4) —$O(CF_2$—$CF(CF_3)O)_t$—
wherein t is an integer such as to meet the above mentioned requirements of molecular weight;

5) —O(CF$_2$CF$_2$CF$_2$O)$_s$— or —O(CF$_2$CF$_2$CH$_2$O)$_s$—
   wherein s is an integer such as to meet the above mentioned requirements of molecular weight.

8. Compositions according to claim 7, wherein the PFPE repeating units of the ionomer polyurethanes have the structure 1).

9. Compositions according to claim 4, wherein the ionomer fluorinated polyurethanes have a fluorine content in the range 30–40% by weight.

10. Compositions according to claim 1, wherein component B) is salified with organic or inorganic acids or nitrogen quaternization is carried out with conventional alkylating agents.

11. Compositions according to claim 1, wherein to the dispersion non ionic surfactants, in amounts in the range 0.01–1.5% by weight with respect to the polymer and co-solvents, preferably polar solvents in amounts not higher than 10% by weight with respect to the polymer and/or protective colloids, are added.

12. Compositions according to claim 1, wherein component A) fluorinated (meth)acrylic (co)polymers are formed of monomers comprising perfluoroalkyl groups preferably with C$_3$–C$_{30}$ chain, or (per)fluoropolyether groups preferably having a chain from 4 to 30 carbon atoms; optionally one or more sulphonamide groups; conventional hydrogenated (meth)acrylic monomers, and cationic (meth)acrylic ionomer monomers.

13. Compositions according to claim 12, wherein the monomers of component A) are selected from the following:
    a) from 1 to 30% by weight of monomers or mixtures thereof having formula $$R^1O(R^2O)_{nII}[C(O)CH_2O]_{mII}COCH=CH_2 \quad (II)$$

wherein
    R$^1$ is a C$_1$–C$_{20}$ alkyl, cycloalkyl, haloalkyl, halocycloalkyl group (halo=Cl, Br);
    R$^2$ is a C$_1$–C$_6$ alkylene or haloalkylene group, each R$^2$ group can be equal to or different from the other R$^2$ groups, at least one R$^1$ or R$^2$ group contains an halogen atom,
    nII is an integer from zero to 10, with the proviso that when n is zero R$^1$ is a C$_1$–C$_{16}$ haloalkyl or halocycloalkyl group;
    mII is zero or 1;
    b) from 60 to 80% of monomers or mixtures thereof having formula $$(R_{fI})_{pI}QOCOCH=CH_2 \quad (I)$$

wherein
    R$_{fI}$ is a fluoroalkyl radical with C$_3$–C$_{30}$ carbon atoms, preferably C$_3$–C$_{20}$, or it is a PFPE (per)fluoropolyether radical containing the above mentioned units and having a number of carbon atoms from C$_5$ to C$_{30}$;
    pI is 1 or 2;
    Q is a linking bridge, divalent or trivalent, e.g., aliphatic from 1 to 12 carbon atoms, or a C$_6$–C$_{12}$ aromatic group; Q can optionally contain heteroatoms such as N, O, S or carbonylimino, sulphonylimino or carbonyl groups; Q can be unsubstituted or is linked to substituents selected from the folowing: halogen atoms, hydroxyl groups, C$_1$–C$_6$ alkyl radicals; Q preferably does not contain double or triple bonds; preferably Q is selected from the following radicals: —CH$_2$—, —C$_2$H$_4$—, —SO$_2$N(R$^5$)

C$_2$H$_4$—, —SO$_2$N(R$^5$)CH$_2$CH(CH$_3$)—, —C$_2$H$_4$SO$_2$N(R$^5$)C$_4$H$_8$—, R$_5$ is H or a C$_1$–C$_4$ alkyl;
    c) from 0 to 15%, preferably from 1 to 15% of monomers or mixtures thereof having formula

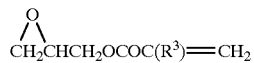
    (III)

wherein R$^3$ is H or methyl;
    d) from 1 to 6% of cationic monomers, or mixtures thereof, of formula $$CH_2=C(R^4) Z_{IV}Y_{IV}^+X^- \quad (IV)$$

wherein R$^4$ is H or methyl,
    the Z$_{IV}$ group is a divalent electron attracting and has a carbonyl or aromatic group or one oxygen or sulphur atom directly linked to the monomer vinylidene radical; the Z$_{IV}$ group can be preferably selected from the following:
    —COOCH$_2$CH(OH)CH$_2$—, —COO(CH$_2$)$_{kIV}$—, —CONH(CH$_2$)$_{kIV}$, wherein kIV is an integer from 2 to 6;
    Y$_{IV}^+$ is a monovalent organic cation and comprises (a) the pyridinium ion, (b) the N$^+$(R$^6$)$_3$ ion wherein each R$^6$ is independently H or a C$_1$–C$_4$ alkyl group, or two of any R$^6$ combine to form a C$_4$–C$_5$ alkylene group, or two of any R$^6$ are —(CH$_2$)$_2$— and combine with an oxygen atom to give the structure —(CH$_2$)$_2$—O—(CH$_2$)$_2$—, (c) phosphonium. ions and (d) sulphonium ions; preferably Y$_{IV+}$ is N$^+$ (R$^6$)$_3$ wherein R$_6$ is as above defined;
    X$^-$ is an anion, preferably an halide (Cl, Br, I) or an alkyl sulphate;
    e) from 0 to 20% of monomers containing at least a double bond, such as for example maleic anhydride, acrylonitrile, vinyl acetate, vinylchloride, vinyl fluoride, vinylidene fluoride, vinylidene cyanide, vinyl chloroacetate, vinyl silicone, ethylene, styrene, alkyl styrenes, halogenated styrenes, methacrylonitrile, N-vinyl carbazol, vinyl pyridine, vinyl alkyl ethers, vinyl alkyl ketones isoprene, butadiene, chloroprene, fluoroprene, and mixtures thereof.

14. Compositions according to claim 13, wherein the monomers of group a) are the esters (halo)alkyl and (halo)cycloalkyl of the (meth)acrylic acid, halo=Cl, Br, from 1 to 20 carbon atoms.

15. Compositions according to claim 13, wherein the monomers of group b) are those containing C$_4$–C$_{12}$ perfluoroalkyl chains, preferably containing the sulphonamide group, selected from:

C$_8$F$_{17}$SO$_2$N(CH$_3$)CH$_2$CH$_2$OCOCH=CH$_2$;

when R$_{fI}$ is based on PFPEs, selected from:

T'O(C$_3$F$_6$O)$_m$(CF$_2$O)$_n$CF$_2$CH$_2$OCH$_2$CH$_2$OCOC(CH$_3$)=CH$_2$ wherein T'=C$_1$–C$_3$ perfluoroalkyl, optionally one or more F atoms of T', generally one F atom, are substituted by H and/or Cl; m and n are as above defined.

T'O—(CF$_2$CF$_2$O)$_{n'}$, (CF$_2$O)$_{m'}$—CF$_2$—A$_q$—T$_o$ wherein T', n' and m' have the above mentioned meanings, q is an integer from 0 to 1, A is a bivalent radical, preferably of linear aliphatic type (CH$_2$)$_{m'_o}$ wherein m'0 is an integer from 1 to 20, or (alkylen)cycloaliphatic, (alkylen)aromatic type. A optionally can contain heteroatoms in the ring or in the alkylene chain, or it can be both a linear and branched polyalkylenoxy chain, in particular containing repeating units of the $CH_2CH_2O$, $CH_2CH(CH_3)O$, $(CH_2)_3O$, $(CH_2)_4O$ type. A can also contain groups of amidic, ester, ether, COO type, of sulphide, iminic type; the carbon atom number of the cycloaliphatic compounds being from 3 to 20, for the aromatic ones from 6 to 20; the A group can also be a combination of the mentioned types;

the bond group of A with the perfluoromethylene group of the fluorinated chain can be for example: —C—, —O—, —CONR— (R is H, alkyl, cycloaliphatic or aromatic groups having less than 15 carbon atoms), —$CO_2$—, —COS—, —CO—, one heteroatom, or the triazinic or heterocyclic aromatic groups having 5 or 6 atoms containing 2 or mnore heteroatoms equal to or different from each other; $T_o$ is —COOCH=$CH_2$, —COOCH$_2$CH=$CH_2$.

16. Use of the compositions according to claim 1 to treat textiles and fibers.

17. Textiles treated with the compositions according to claim 1.

18. Compositions according to claim 1, wherein the weight ratio A):B), calculated on the dry product, is in the range 60:40 and 40:60.

19. Compositions according to claim 1, wherein the organic solvents of polar type are ketones or acetates.

20. Compositions according to claim 1, wherein the chain extenders are diols or diamines ($C_2$–$C_{12}$).

* * * * *